United States Patent [19]
Decker et al.

[11] Patent Number: 5,908,484
[45] Date of Patent: Jun. 1, 1999

[54] METHOD OF MAKING A COATED OPTICAL FIBER COMPRISING MEASURING THE DELAMINATION RESISTANCE OF THE COATING

[75] Inventors: Robert LeRoy Decker, Parsippany; Arthur Clifford Hart, Jr., Chester; Valerie Jeanne Kuck, Upper Montclair; Mark Anthony Paczkowski, Green Township, Sussex County; Peter Gerald Simpkins, Chatham, all of N.J.

[73] Assignee: Lucent Technologies Inc., Murray Hill, N.J.

[21] Appl. No.: 09/174,049

[22] Filed: Oct. 16, 1998

[51] Int. Cl.⁶ .............................. C03B 37/02; C03B 37/07
[52] U.S. Cl. .................... 65/377; 65/382; 65/484; 65/430; 65/435
[58] Field of Search .............................. 65/377, 382, 484, 65/491, 430, 435

[56] References Cited

U.S. PATENT DOCUMENTS

| | | |
|---|---|---|
| 4,331,463 | 5/1982 | Briere et al. . |
| 4,523,938 | 6/1985 | Grego . |
| 4,793,840 | 12/1988 | Harding . |
| 5,013,130 | 5/1991 | Atkins et al. . |
| 5,073,179 | 12/1991 | Yoshimura et al. . |
| 5,703,988 | 12/1997 | Oishi et al. . |

*Primary Examiner*—Steven P. Griffin
*Attorney, Agent, or Firm*—Eugen E. Pacher

[57] ABSTRACT

Measurement of the delamination resistance of polymer coated optical fiber can provide valuable information for quality control and/or coating development, and a method of making polymer coated optical fiber that includes determination of the delamination resistance is disclosed. Also disclosed is apparatus that facilitates determination of the delamination resistance.

6 Claims, 2 Drawing Sheets

METHOD OF MAKING A COATED OPTICAL FIBER COMPRISING MEASURING THE DELAMINATION RESISTANCE OF THE COATING

FIELD OF THE INVENTION

This invention pertains to methods of making polymer coated optical fiber.

BACKGROUND

Optical fibers typically are polymer coated to protect them against damage. During fiber manufacture and subsequent handling, it is necessary to maintain the interfacial bond between the (typically silica) fiber and the coating that contactingly surrounds the fiber. This coating is frequently referred to as the "primary" coating. A further coating that surrounds the primary coating is frequently referred to as the "secondary" coating.

The interfacial bond between the fiber and the primary coating desirably is strong to prevent bond failure during fiber manufacture and subsequent handling. Such failure can result in the formation of a "delaminated" area which can adversely affect the optical performance of the fiber. A delaminated area is characterized by an air gap at or near the interface of the fiber and the primary coating. The air gap typically alters the mechanical properties at the point of delamination, and may cause fiber transmission losses. Even if the optical performance is substantially not affected, the presence of delamination can result in negative customer perception and is therefore unacceptable. Thus, the fiber/primary coating bond desirably should be robust.

On the other hand, during fiber installation and many other operations it is necessary to easily and cleanly remove the coating from a portion of the fiber. For this reason it is necessary that the fiber/primary coating bond strength be not too great.

From the above discussion it is apparent that the strength of the fiber/primary coating bond is an important characteristic of an optical fiber. This strength can be expressed in terms of a delamination resistance. It will also be apparent that it would be highly desirable to have available a simple, reliable method of determining the delamination resistance. Such a method could be used during fiber manufacture as a quality control method, but could also be used during development of a new coating. This application discloses such a method, and apparatus that facilitates practice of the method.

SUMMARY OF THE INVENTION

The invention is embodied in a method of making a polymer-clad optical fiber that comprises a step of determining the delamination resistance of the polymer coating from the fiber. The delamination resistance can be determined for the purpose of quality control, but it can also be determined for the purpose of formulation of a new coating polymer. In the former case, the fiber will be referred to as "production" fiber, and in the latter case it will be referred to as "development" fiber.

More specifically, the method of making a coated optical fiber comprises providing an optical fiber preform, heating at least a portion of the preform, drawing uncoated optical fiber from the heated portion of the preform, and applying a polymer coating to the uncoated optical fiber.

Significantly, the method further comprises determining, subsequent to application of the polymer coating, the delamination resistance of the polymer coating of a portion of the coated optical fiber, and comparing the delamination resistance with a predetermined target value of delamination resistance. If indicated by the comparison, the application step can be changed such that subsequently made coated optical fiber has a delamination resistance that is closer to the target value than the previously determined delamination resistance. By way of example, the application step can be changed by altering the degree of cure of the polymer, or by altering the chemistry and/or the physical properties of the primary and/or secondary coating.

Coated optical fiber having delamination resistance outside a predetermined range will typically be rejected, but could be used in an application that has different delamination resistance requirements.

DETAILED DESCRIPTION

The method according to the invention comprises determination of the delamination resistance of polymer coated optical fiber, and we have developed apparatus that facilitates rapid and consistent determination of the delamination resistance.

The apparatus facilitates contacting the coated fiber with a member of predetermined shape, and urging the member against the coated fiber with a predetermined force for a predetermined length of time. After withdrawal of the member, delamination (if it has occurred) can be readily detected by, e.g., optical means.

To the best of our knowledge, the prior art does not disclose or suggest determination of the delamination resistance for quality control and/or coating development purposes, and also does not disclose or suggest apparatus for such determination. However, in view of the herein disclosed utility of knowing the delamination resistance of a coated fiber, it is likely that those skilled in the art will desire to determine delamination resistance, and for this purpose may develop apparatus that differs from the herein disclosed exemplary apparatus. Clearly, our invention does not depend on the apparatus and/or technique that are used to determine the delamination resistance, and use of other such apparatus and/or techniques in the practice of the invention is contemplated.

Figure 1:
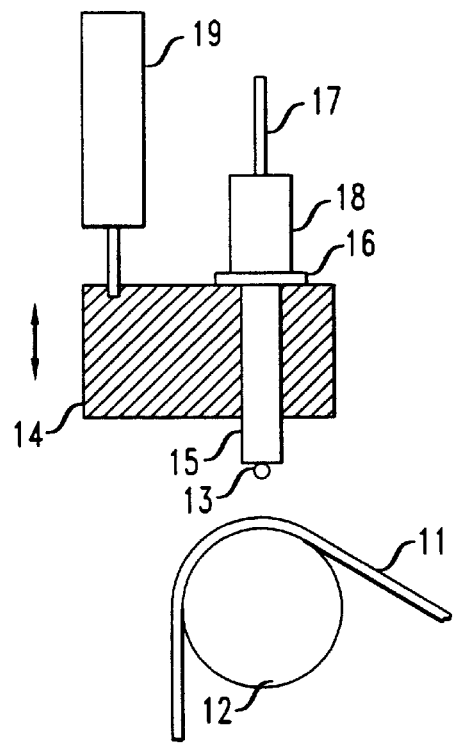
FIGS. 1 and 2 schematically depict exemplary apparatus for determination of delamination resistance.

FIG. 1 schematically depicts apparatus 10 for delamination resistance measurement. Coated optical fiber 11 is supported by cylindrical support member 12 (exemplarily a 5 cm diameter aluminum cylinder with or without a shallow circumferential fiber-guiding groove). A tensile force can be applied to the fiber by conventional means. Member 13 (e.g., a 6 mm long steel cylinder of 6 mm diameter) is attached to free floating plate 15, oriented such that the axis of member 13 is at right angle to the fiber axis. Plate 15 loosely fits into a passage through capture plate 14. A conventional motor drive 19 lowers or raises the capture plate, exemplarily under computer control. Plate 15 also comprises a shoulder 16 that comes to rest on capture plate 14 when the plate is raised, and a load-retaining rod 17. Weight 18 serves to urge member 13 against the coated fiber with known load.

FIG. 1 shows apparatus 10 in rest position, with member 13 raised off the fiber. In order to make a measurement, motor drive 19 is caused to lower capture plate 14 at a predetermined speed (e.g., 10 cm/minute) beyond the position of contact between member 13 and fiber 11. When contact is established, shoulder 16 of free floating plate 15 is raised off capture plate 14, and member 13 is urged against the coated fiber with known force due to weight 18. After a predetermined time (e.g., 5 seconds), the motor drive is caused to raise capture plate 14, thereby withdrawing member 13 from the fiber. After moving the fiber relative to apparatus 10 (e.g., by 3 mm longitudinally), further measurements can be made.

Figure 2:
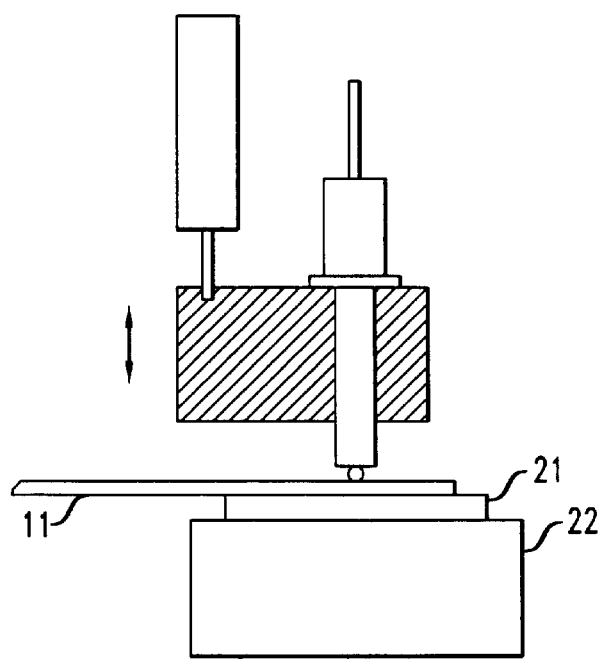

It will be understood that the apparatus of FIG. 1 is exemplary only, and that other configurations are possible. For instance, FIG. 2 schematically shows apparatus wherein the optical fiber 11 is secured to a flat specimen holder 21 (e.g., a glass plate), which rests on support means 22. Member 13 and/or support member 12 can have a shape other than cylindrical. Their shape generally will affect the delamination response of the coated fiber.

After an appropriate number (e.g., 10 for each value of the load) of fiber coating areas have been impacted, the fiber typically is removed from the apparatus, an index matching liquid (e.g., glycerin) is applied to the impacted areas, and these areas are examined by means of a conventional optical microscope. Microscopic examination of the optical fiber readily reveals whether or not delamination has occurred in a given one of the impacted areas. Using this procedure, the percent of delaminated areas as a function of the applied load is readily established. These data can then be further processed, as desired. For instance, a fit of the data can yield the threshold load for delamination, the load required for 50% of the impacted areas to delaminate, and the minimum load required to achieve delamination in all the impacted areas. These values can, for instance, be used to establish a correlation between delamination resistance and degree of cure chemical composition and/or mechanical properties of the primary and/or secondary coating.

Figure 3:
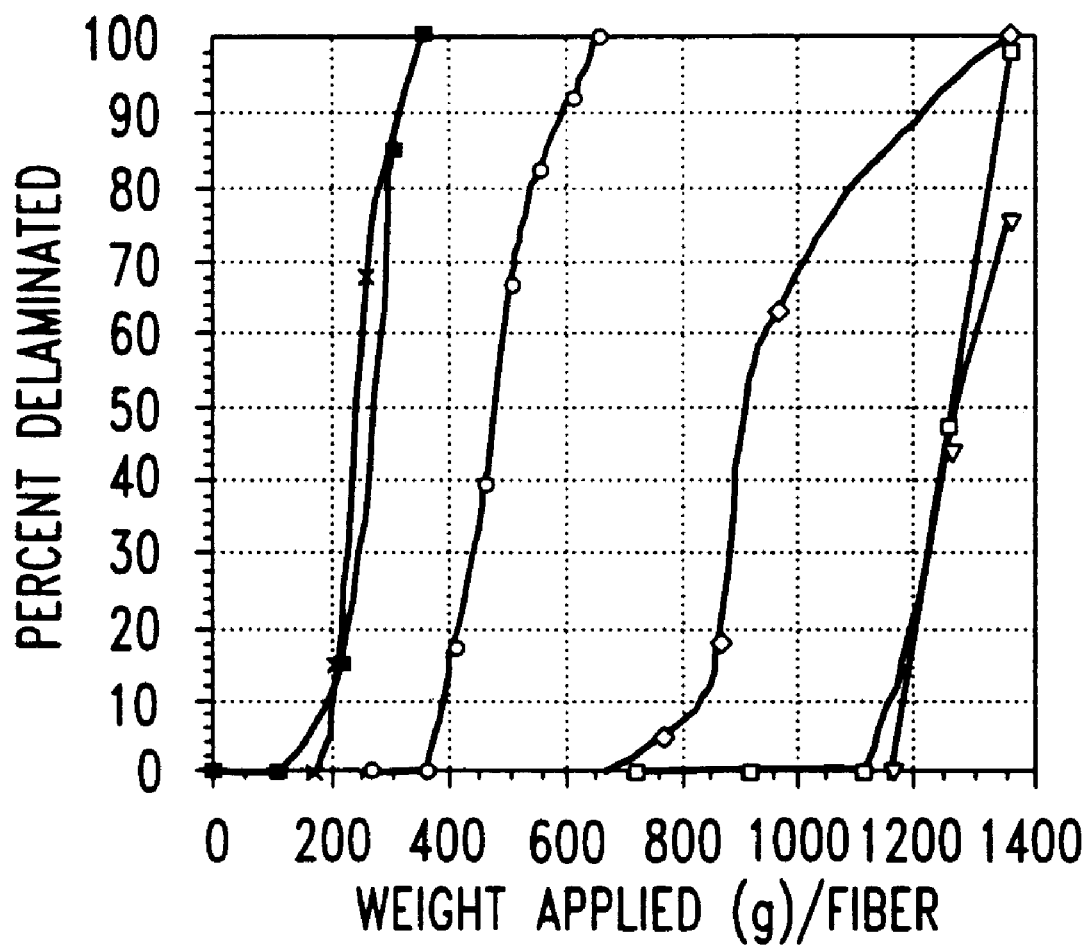
FIG. 3 shows exemplary delamination data.

FIG. 3 shows delamination data for various polymer-coated fibers, obtained substantially as described above. The coatings differ from each other, and FIG. 3 clearly shows that polymer coatings can differ widely with respect to their delamination resistance. Thus, measurements of delamination resistance can provide valuable data for coating development and/or quality control. By way of example, measurements of delamination resistance can help elucidate the relationship between compositional changes and delamination performance, as well as the relationship between physical properties, such as degree of cure, and the inclusion of additives.

The invention claimed is:

1. Method of making a coated optical fiber comprising a) providing an optical fiber preform;

b) heating at least a portion of the optical fiber preform;

c) drawing uncoated optical fiber from the heated portion of the optical fiber preform; and d) applying a polymer coating to the uncoated optical fiber; CHARACTERIZED IN THAT the method further comprises e) determining, subsequent to application of the polymer coating, a delamination resistance of the polymer coating of at least a portion of the coated optical fiber;

f) comparing the delamination resistance determined in step e) with a predetermined target value of delamination resistance; and g) if indicated by the comparing step, changing step d) such that subsequently made coated optical fiber has a delamination resistance that is closer to said target value.

2. Method according to claim 1, wherein the coated optical fiber is production optical fiber, and the delamination resistance is determined as a quality control measure.

3. Method according to claim 1, wherein the coated optical fiber is a development fiber, and the delamination resistance is determined for purposes of coating development.

4. Method according to claim 1, wherein step e) comprises urging, with predetermined force and for a predetermined time, a member of predetermined geometry against said coated optical fiber, the area of contact between said member and the coating to be referred to as the impacted area.

5. Method according to claim 4, wherein said member of predetermined geometry is a cylindrical member having an axis, the member being disposed such that said axis is substantially perpendicular to an axis of the coated optical fiber.

6. Method according to claim 4, wherein step e) further comprises applying, after said urging step, an index matching medium to the coated optical fiber, and determining by means of an optical microscope whether coating delamination has occurred in a given impacted area.

* * * * *